May 31, 1938.  E. H. SMITH  2,119,250
BEER FAUCET
Filed Oct. 5, 1937
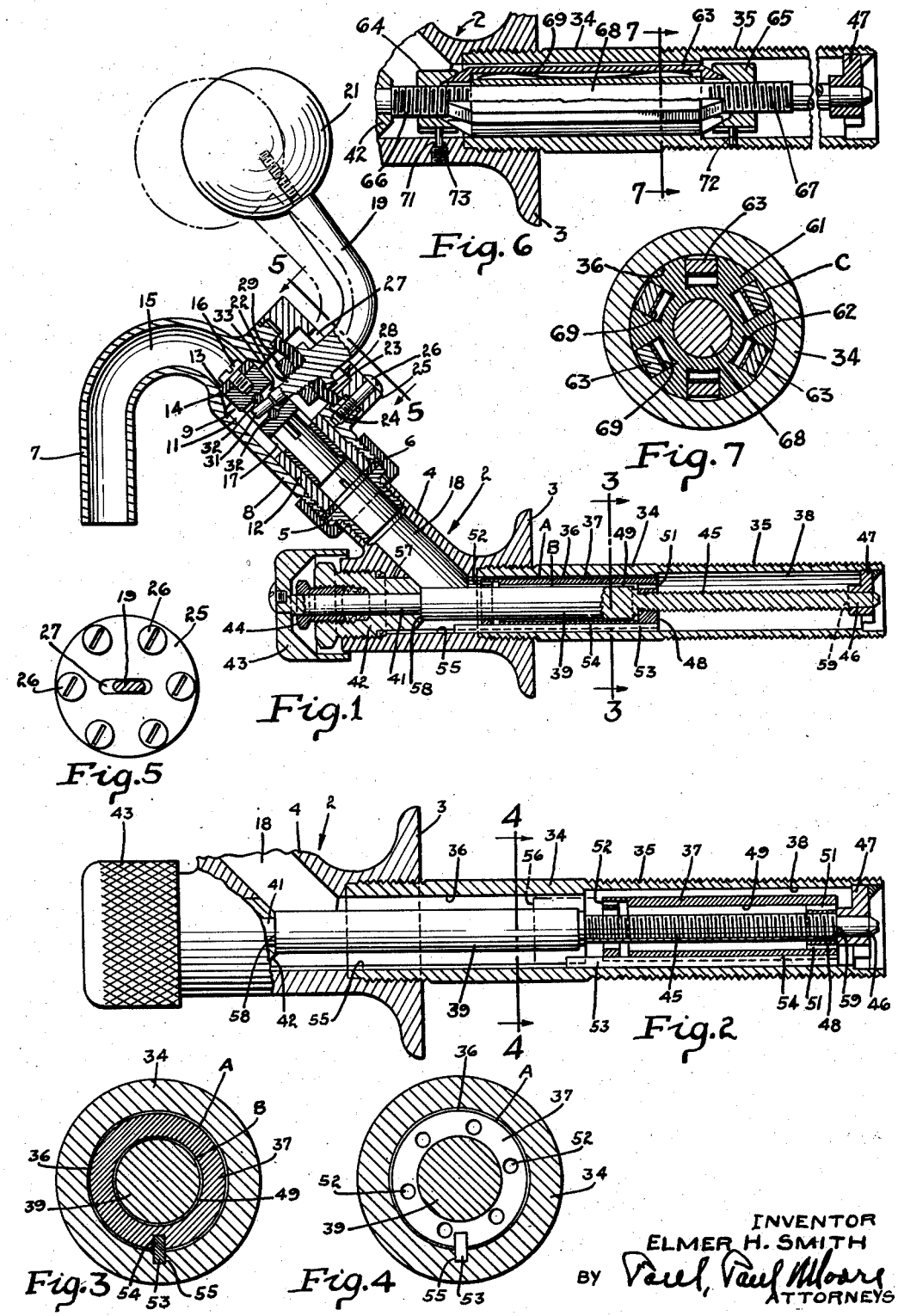
INVENTOR
ELMER H. SMITH
BY Paul, Paul Moore
ATTORNEYS Patented May 31, 1938

2,119,250

UNITED STATES PATENT OFFICE 2,119,250

BEER FAUCET

Elmer H. Smith, Minneapolis, Minn., assignor to Smith Welding Equipment Corporation, Minneapolis, Minn., a corporation of Delaware Application October 5, 1937, Serial No. 167,351

4 Claims. (Cl. 138—46)

This invention relates to new and useful improvements in beer faucets or devices for dispensing gaseous fluids or liquids.

An object of the present invention is to provide a beer faucet having complemental members cooperating to provide one or more restricted passages, through which the liquid must flow from its source to the dispensing nozzle, and said members being relatively adjustable to vary the length of said restricted passages thereby to vary the throttling effect or resistance offered to the flow of the liquid, when the faucet is open.

I am aware of the fact that beer faucets have heretofore been developed comprising complemental members which cooperate to provide a restricted passage through which the liquid must flow in its passage from the source of supply to the dispensing nozzle, and which members are relatively movable to vary the size of said restricted passage, cross-sectionally. To the best of my knowledge, in these faucets, the annular restricted passage has been formed by the walls of a tapered or conical bore and a correspondingly tapered or conical sleeve or plug, having means for longitudinally moving it in said bore to vary the size of the annular restricted passage. In these devices, the annular restricted passage is varied in cross-sectional area, by relative adjustment of the sleeve, which, obviously, varies the flow of liquid through the restricted passage. I have found from actual experience, that beer which is comparatively "wild", may be more accurately controlled by causing the beer to flow through a restricted passage of constant cross-sectional area, and then varying the effective length of said passage in accordance with the wildness of the beer.

The novel faucet herein disclosed embodies this important feature, and provides means whereby the effective length of the annular restricted passage may be conveniently varied, by manipulation of a simple control element conveniently positioned on the faucet body, whereby the throttling effect or resistance offered to the flow of beer through the faucet may readily be controlled in accordance with the wildness of the beer.

An important feature of the present invention, therefore, resides in the novel means provided for varying the length of the annular restricted passage through which the beer must flow in its passage through the faucet when the latter is opened.

A further object resides in the provision of a liquid throttling or retarding device, comprising an expansible element mounted in the passage through which the liquid must pass whereby a restricted passage is provided which may readily be varied in accordance with the wildness of the liquid.

A further object of the invention resides in the novel construction of the valve means provided in the faucet, which is so constructed that the pressure of the beer in the faucet, when the valve means is closed, will constantly tend to tightly hold the valve on its seat, and whereby the valve is rendered self-seating without the use of springs or other tension means for thus seating the valve.

A further object resides in the unique means provided for supporting the operating lever of the faucet.

Other objects of the invention will appear from the following description and accompanying drawing and will be pointed out in the annexed claims.

In the accompanying drawing there has been disclosed a structure designed to carry out the various objects of the invention, but it is to be understood that the invention is not confined to the exact features shown as various changes may be made within the scope of the claims which follow.

In the drawing:

Figure 1 is a vertical sectional view of the faucet showing the general construction thereof;

Figure 2 is an enlarged detail sectional view of the throttling means showing it in inoperative position;

Figure 3 is an enlarged cross-sectional view on the line 3—3 of Figure 1, showing the annular restricted passages through which the liquid must flow from its source to the nozzle;

Figure 4 is a cross-sectional view on the line 4—4 of Figure 2;

Figure 5 is a detail sectional view on the line 5—5 of Figure 1;

Figure 6 is a view showing only a portion of the faucet and illustrating a throttling device of somewhat different construction; and Figure 7 is a cross-sectional view on the line 7—7 of Figure 6.

The novel beer faucet herein disclosed, is shown comprising a body, generally indicated by the numeral 2, having a flange 3 adapted to be seated against a fixed support to which the faucet may be secured in the usual manner.

The body 2 is shown comprising an upwardly and forwardly inclined extension 4, threaded to receive a flanged bushing 5. A coupling member 6 is bored to receive the extension 4 and is retained thereon by the flanged bushing 5, as will readily be understood by reference to Figure 1.

A feature of the invention resides in the construction of the valve means for dispensing the liquid from the faucet. As shown in Figure 1, a nozzle 7 has a portion 8 detachably secured to the valve body 2 by the coupling member 6. A valve member, generally indicated by the numeral 9, is supported in a valve chamber 11 provided in the portion 8 of the nozzle, and has one end guidingly supported in a guide 12 secured to the chamber 11 by threaded engagement with the walls thereof.

The upper end of the valve member 9 has a suitable packing 13 adapted to engage a conical seat 14, provided at the juncture between the valve chamber 11 and the passage 15 in the nozzle 7. The packing 13 is preferably detachably secured to the end of the member 9 by a suitable screw 16. The valve member 9 is hollow at its wall and has a plurality of slots 17 for establishing communication between the chamber 11 and the passage 18 provided in the extension 4 of the faucet body.

An operating lever 19, having a suitable handle 21, is provided for axially translating the valve member 9 to control the dispensing of the liquid from the faucet. The operating lever is preferably angularly shaped, as shown in Figure 1, and has a threaded portion 22 received in an aperture provided in a suitable flexible element or diaphragm 23, the marginal edge of which is secured to a seat 24 in the portion 8 of the faucet, by a clamping member or cap 25. The member 25 is secured in place by a plurality of screws 26, as best illustrated in Figure 2. The cover or cap 25 has an elongated opening 27 therein adapted to receive the lever 19, which preferably is flat, as shown in Figure 5.

To secure the lever 19 to the diaphragm 23, the lever is shown provided with an annular flange 28, between which and a clamping nut 29, the diaphragm is secured, as clearly illustrated in Figure 1. The clamping nut 29 is received in threaded engagement with the threaded portion 22 of the lever.

The lever 19 is provided below the diaphragm 23 with a reduced terminal 31, shown received between two pins 32, secured in the body of the valve member 9. A suitable opening 33 is provided in the member 9 to receive the terminal 31 of the lever 19. The pins 32 are preferably replaceable, so that they may be interchanged if they become worn, thereby to compensate for wear between the operating surfaces of the valve member 9 and terminal 31 of the operating lever.

Another important feature of the invention resides in the means provided for throttling the flow of beer through the faucet, and whereby the desired head of foam may be obtained, regardless of the gaseous content of the beer.

To thus throttle the flow of beer through the faucet, a tubular member 34 has one end secured in a threaded socket provided in the body 2 of the faucet, and extends outwardly therefrom and is adapted to be received in a suitable opening provided in the supporting means for the faucet, not shown. The projecting end portion of the tubular member 34 is threaded, as shown at 35, to receive a suitable clamping nut, not shown, for securing the faucet in place.

The tubular member 34 is shown provided at its inner end with a cylindrical bore 36, adapted to receive a cylindrical sleeve generally indicated by the numeral 37. The outside diameter of the sleeve 37 is slightly less than the diameter of the bore 36, whereby the periphery of the sleeve 37 cooperates with the wall of the bore 36 to provide a restricted annular passage A of uniform cross-sectional area, substantially throughout its entire length. The opposite or outer end of the tubular member 34 is provided with a relatively larger bore 38.

A stem 39 is shown axially disposed within the bore 36, and has a reduced end portion 41 rotatably received in a bushing 42, detachably secured in the body 2 of the faucet. A suitable cap 43 is secured to the projecting end of the reduced extension 41 of the stem 39, and preferably has its periphery knurled to facilitate rotating it and the stem 39. A suitable packing gland 44 is received in threaded engagement with the bushing 42 to prevent leakage of the liquid around the reduced portion 41 of the stem, as will readily be understood by reference to Figure 1.

The stem 39 is provided at its opposite end with a threaded extension 45 having a reduced terminal 46 rotatably supported in a centering element 47, suitably secured against rotation in the end of the bore 38. The member 47 is provided with suitable openings to provide free passage of the liquid therethrough.

The sleeve member 37 is supported on the stem 39 and is adapted for axial movement thereon by means of the threaded extension 45, which is received in threaded engagement with the end portion 48 of the sleeve, as clearly illustrated in Figures 1 and 2. By thus operatively connecting the sleeve with the extension 45 of the stem 39, when the latter is rotated by manipulation of the head 43, the sleeve will be axially translated within the bore 36, thereby varying the effective length of the restricted passage A.

To increase the efficiency of the throttling means, the sleeve 37 is shown provided with a core 49, which is slightly larger in diameter than the diameter of the intermediate portion of the stem 39, whereby the wall of the bore 49 cooperates with the periphery of the intermediate portion of the stem to provide an annular restricted passage B, which also is of uniform cross-sectional area its entire length. A plurality of suitable apertures 51 are provided in the end portion 48 of the sleeve 37 to establish communication between the bores 38 and 49, and similar apertures 52 are provided in the opposite end of the sleeve 37 to establish communication between the bore 49 of the sleeve and the passage 18 at the opposite end thereof.

A suitable feather key 53 is secured in a key-way or recess 54, provided in the periphery of the sleeve 37. The key 53 travels in a key-way 55 provided in the bore 36 of the tubular member 34, and permits free axial movement of the sleeve 37, but prevents relative rotation thereof.

The construction of the sleeve 37 with respect to the bore 36 of the tubular member 34, and the diameter of the enlarged central portion of the stem 39 is such therefore, that dual restricted passages A and B are provided, through which the beer must pass from the receiving end of the tubular member 34 to the nozzle 7, when the valve member 9 is opened by manipulation of the handle 21. When the sleeve is positioned, as shown in Figure 1, the maximum throttling effect is obtained, which is desirable when dispensing relatively wild beer. When some of the wildness of the beer has been dissipated, the stem 39 is rotated in a direction to cause the sleeve 37 to move in a direction towards the right, when viewed as shown in Figure 1, whereupon the effective lengths of the two restricted passages A and B, are decreased in length, because of the relatively larger bore 38 into which the sleeve is moved, and also because of the relatively smaller diameter of the end portion 45 of the stem 39.

From actual experience, I have found that by relatively adjusting the sleeve 37 within the bore 36, the beer may be dispensed into a receptacle with the desired head or amount of foam, regardless of the "wildness" thereof. By making the restricted passages A and B cylindrical their entire lengths, more positive control of the beer is obtained than is possible when a conical bore and conical sleeve are employed, whereby the annular restricted passage constantly varies in cross-sectional area, when the sleeve is axially adjusted within the bore. If the beer is "tame", or is low in gaseous content, the sleeve 37 may be moved to the dotted line position, indicated at 56 in Figure 2, wherein it will be noted that the restricted passages A and B are very short in an axial direction. If it is desired to flush the faucet for cleaning purposes, the sleeve 37 may be moved to an inoperative position, as shown in full lines in Figure 2, whereby free passage is provided for the beer through the tubular member 34.

The throttling means is so constructed that the sleeve 37 may readily be removed from the tubular member 34 without dismantling or removing the faucet from its supporting means. This may be conveniently accomplished by simply detaching the head 43 from the stem 39, and unscrewing the bushing 42, whereupon the stem 39 and sleeve 37 may be removed from the tubular member 34 through the opening provided at the front of the valve body for the bushing 42. It is to be understood that the bore 57 which supports the inner reduced end of the bushing 42 is of substantially the same diameter as the bore 36, so that the sleeve 37 may readily pass therethrough. Longitudinal movement of the stem 39 is prevented by reason of the shoulder 58 at the front end thereof engaging the adjacent end of the bushing 42, and the shoulder 59 provided at the opposite end of the stem which engages the member 47 at the opposite end of the tubular member 34.

In some instances, it may be found desirable to eliminate one of the annular restricted passages A or B, but I have found that more accurate control of the beer is made possible by the provision of two annular restricted passages, as shown in Figure 1.

The valve operating means is extremely simple in construction and is positive in operation. It comprises very few parts and a minimum of joints between the operating handle 21 and the valve member 9. The diaphragm 23 provides a universal mounting for the operating lever 19, whereby the latter may be conveniently operated between the full and dotted line positions, shown in Figure 1, with a minimum of effort. The elongated slot 27 in the cap 25, eliminates any tendency of the operating lever relatively rotating with respect to the faucet body.

The particular arrangement of the valve member 9 within the chamber 11 is such that the pressure of the beer in the passage 18 and in and around the valve member 9 is such as to constantly tend to seat the valve, whereby the latter becomes substantially self-seating. No springs are necessary to hold the valve member 9 on its seat, when the faucet is closed, and the diaphragm 33, in addition to supporting the operating lever 19, also positively prevents leakage of beer from the interior of the faucet around the operating lever. The diaphragm 23, also provides substantially a frictionless pivotal support for the operating lever, whereby the faucet may be operated with utmost ease, regardless of the condition of the beer.

In the drawing, I have shown the faucet in its preferred form, but it is to be understood that various changes may be made in the constructional details thereof, without departing from the scope of the invention.

Figures 6 and 7 illustrate a throttling means of modified form wherein a sleeve 61 is mounted within the bore 36 and is provided with a plurality of longitudinally extending grooves or recesses 62 in its periphery. A spring actuated element 63 is provided in each recess 62, and the outer surfaces of said elements cooperate with portions of the wall of the bore 36 to provide a plurality of longitudinally extending restricted passages through which the liquid must flow from the receiving end of the tubular member 34 to the valve means provided in the body 2.

The periphery of the sleeve 61 substantially fits the bore 36. The elements 63 are radially adjustable by suitable nuts 64 and 65, received in threaded engagement with threaded portions 66 and 67, respectively, of a stem 68, the end portions of which are rotatably supported in the guide 47 and bushing 42 in a manner similar to the stem 39, shown in the previous figure. The threaded portions 66 and 67 are made right and left hand, whereby when the stem 68 is rotated by means of the finger grip 43, the nuts 64 and 65 will be moved towards or away from one another, depending upon the direction of rotation thereof. The elements 63 have tapered terminals received in conical seats or bores provided in the nuts 64 and 65 whereby radial movement is imparted to the elements 63, when the stem 68 is rotated, thereby varying the size of the restricted passages C. Suitable springs 69 are interposed between the elements 63 and the bottoms of the recesses 62 and constantly urge the elements 63 outwardly.

Suitable means is provided for preventing relative rotation of the nuts 64 and 65. Such means is shown consisting of a pair of pins 71 and 72, the former having a threaded head 73, whereby it is detachably supported in the body 2. To remove the sleeve 61 from the bore 36, the pin 71 is removed from the body 2, whereupon the stem 68, with the sleeve 61 mounted thereon, may readily be removed from the front end of the body 2, in a manner similar to the structure illustrated in Figure 1. Other means applicable for the purpose, may be provided for preventing rotation of the nuts 64 and 65, and the means for radially adjusting the elements 63, may also be varied without departing from the scope of the invention.

The structure illustrated in Figures 6 and 7 operates in a manner similar to the one illustrated in the previous figures, except that, instead of providing an annular restricted passage, a plurality of longitudinally extending restricted passages are provided through which the liquid must flow, and which, as above stated, are adjustable in size, whereby they may be varied to obtain the desired throttling effect upon the beer being dispensed from the faucet.

I claim as my invention:

1. In a device of the class described, a member provided with a cylindrical bore, a sleeve supported in said bore and having its periphery spaced from the wall of the bore, thereby to provide an annular restricted passage, said sleeve also having a cylindrical bore, a stem for supporting the sleeve in the bore in said member and having a cylindrical portion received in the bore of the sleeve, the periphery of said cylindrical stem portion being spaced from the wall of the sleeve bore, thereby to provide a second annular restricted passage, and means whereby the sleeve may be longitudinally adjusted in the bore in said member and with reference to the cylindrical portion of the stem, thereby to vary the effective lengths of said restricted passages, and whereby the throttling effect of the beer passing through said passages may be varied.

2. In a device of the class described, a body having a tubular member extending therefrom, a cylindrical sleeve mounted in said tubular member and having a cylindrical bore therein, a stem having a cylindrical portion axially disposed within said bore and having its wall spaced from the wall of the bore, thereby to provide an annular restricted passage, and means whereby the stem and sleeve may be relatively adjusted in a longitudinal direction with respect to one another, thereby to vary the effective length of said annular restricted passage, and therefore the throttling effect of the liquid passing therethrough.

3. In a beer dispensing faucet comprising a unit structure adapted to be connected to a source of beer, said structure including a body having a longitudinal bore therethrough and a dispensing valve for controlling the flow of beer therefrom, means for preventing foaming of the beer comprising a regulating means in said bore interposed between said dispensing valve and the source of beer supply, said bore having portions of different internal dimensions, the portion of the bore of less dimension being of uniform cross-section, said regulating means including a sleeve member mounted for longitudinal movement in said bore in overlapping relation to said bore portions, the effective portion of said sleeve member being of uniform dimension throughout its length so as to form with the bore of less dimension a restricted passageway of substantially uniform cross-sectional area, and means for moving said sleeve member longitudinally in said bores to vary the relative length of the restricted passageway defined by the smaller bore and said sleeve member, thereby to provide a restricted passageway of variable length and uniform cross-sectional area throughout its length and through which the beer must pass before reaching said dispensing valve.

4. In a beer dispensing faucet comprising a unit structure adapted to be connected to a source of beer, said structure including a body having a longitudinal bore of circular cross-section therethrough and a dispensing valve for controlling the flow of beer therefrom, means for preventing foaming of the beer comprising a regulating means in said bore interposed between said dispensing valve and the source of beer supply, said bore having portions of different internal dimensions, the portion of the bore of less dimension being of uniform circular cross-section, said regulating means including a cylindrical sleeve member mounted for longitudinal movement in said bore in overlapping relation to said bore portions, the effective portion of said sleeve member being of uniform cylindrical dimension throughout its length so as to form with the bore of less dimension a restricted passageway of substantially uniform circular cross-sectional area, and means projecting through said body portion in axial alignment with said sleeve member and operatively connected thereto for moving said sleeve member longitudinally in said bores to vary the relative length of the restricted passageway defined by the smaller bore and said sleeve member, thereby to provide a restricted passageway of variable length and uniform cross-sectional area throughout its length and through which the beer must pass before reaching said dispensing valve.

ELMER H. SMITH.